Feb. 7, 1939.  J. A. SHERMAN  2,145,897

SWIVEL ELECTRIC ATTACHMENT PLUG

Filed Oct. 15, 1936

INVENTOR
JOHN A. SHERMAN
BY
Robert A. Lavender
ATTORNEY

Patented Feb. 7, 1939

2,145,897

UNITED STATES PATENT OFFICE 2,145,897

SWIVEL ELECTRIC ATTACHMENT PLUG

John A. Sherman, San Pedro, Calif.

Application October 15, 1936, Serial No. 105,654

1 Claim. (Cl. 173—324)

(Granted under the act of March 3, 1883, as amended April 30, 1928; 370 O. G. 757)

This invention relates to a swivel electric attachment plug, and has for an object to provide an improved electric attachment plug which can be assembled in any direction of rotation instead of having two fixed post contacts which must be exactly matched up before the male and female plug and socket portions can be joined together.

A further object of this invention is to provide an electric plug especially adapted for use on the bottom of a table leg or leg of any other piece of furniture so that the male plug in the leg may be connected to a female socket in the floor, yet at the same time make it possible for the table or piece of furniture to be placed elsewhere, when the plug is not to be used, without ruining the male plug, but allowing it to remain capable of and ready for use at any time it is desired to again connect it to the female socket.

A further object of this invention is to provide an electric plug having retractible contact posts in the male element which posts will automatically retract into the plug whenever they are forced against an unyielding surface, as when the plug is located in the leg of a piece of furniture, and the furniture is located elsewhere than over a proper female receptacle.

With the foregoing and other objects in view, as will hereinafter be apparent, this invention consists in the construction, combination and arrangement of parts, as is hereinafter described, claimed, and illustrated in the accompanying drawing, wherein, Fig. 1 is a partly sectional and partly elevational view of the retractible contact form of this invention as applied to a table leg;

Figure 3:
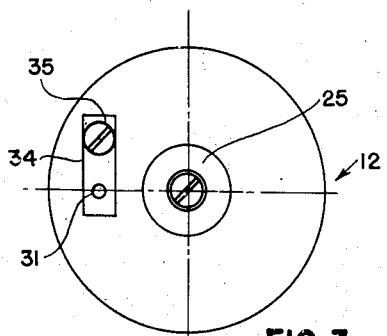
Fig. 3 is a top plan view of Fig. 2.
Figure 5:
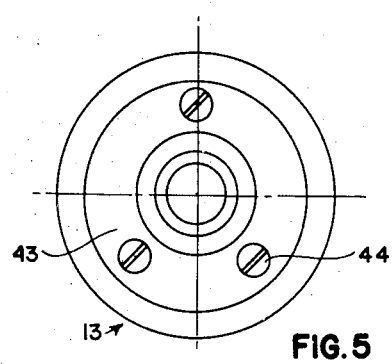
Fig. 5 is a top plan view of Fig. 4.
Figure 2:
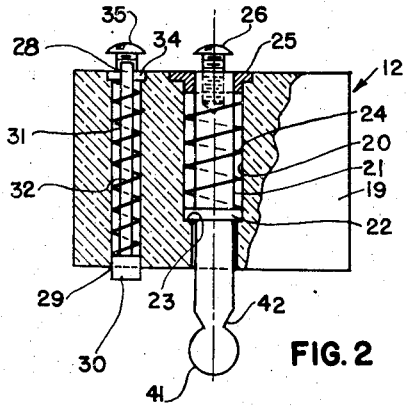
Fig. 2 is a sectional view of the male plug of Fig. 1.
Figure 4:
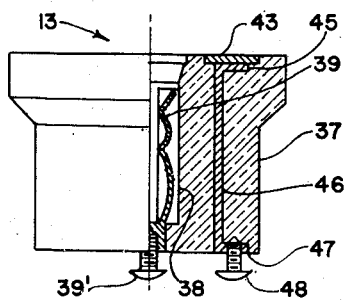
Fig. 4 is a sectional view of the female socket of Fig. 1.
Figure 1:
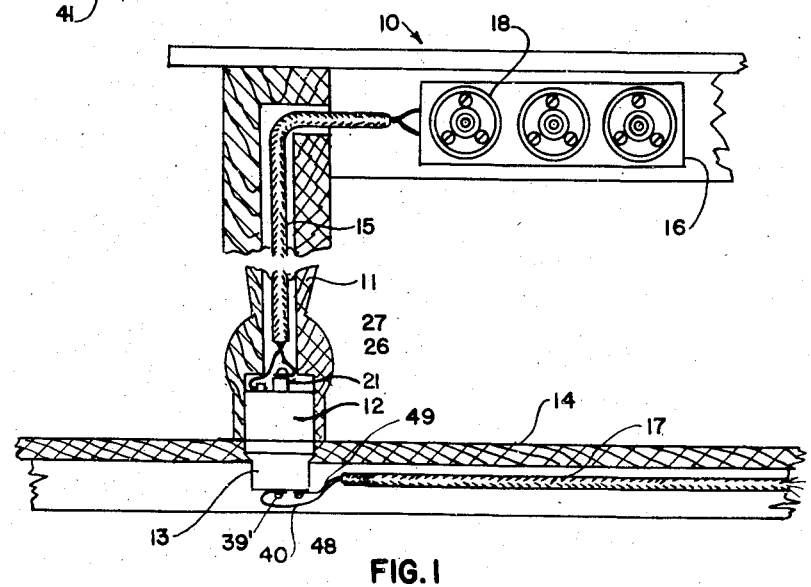

There is shown at 10 a table, in the leg 11 of which the male plug portion 12 of this invention has been inserted for cooperation with female receptacle portions 13 located in the supporting surface or floor 14. A conduit 15 extends from the male plug 12 through the leg 11, which has been hollowed to receive it, to a multiple receptacle plate 16 provided with a plurality of receptacles 18, thereby providing a suitable outlet for the attachment of table electric appliances such as percolators, waffle irons, toasters, etc. The female receptacle portion 13 in the floor 14 is connected by a conduit 17 to any suitable source of electrical energy.

The male plug 12 comprises an insulating body member 19 having a central counterbore 20 extending therethrough for a retractible central contact post 21. This post 21 is provided with collar 22 adapted to be held in abutting relation with the shoulder 23 of the counterbore 20 by a fairly strong compression spring 24, the other end of the spring resting against an externally threaded nut 25 at the end of the counterbore 20, this nut 25 being centrally apertured to permit the contact post 21 to pass freely therethrough, while a screw 26 in the end of the post 21 provides a means for securing one of the leads 27 of the conduit 15 thereto.

A second retractible contact post 28 is located adjacent one side of the body 19 in an aperture 29 extending completely therethrough. This contact post 28 is provided with a contact head 30 mounted on a stem 31, a compression spring 32 resting against the shoulder 33 on the top of the head 30 and against a countersunk plate 34 having an aperture through which the end of the stem may move freely. This plate 34 is provided with a screw 35 for connecting the other lead 36 of conduit 35 thereto. The end of the stem 31 is held from being lost through the aperture in the plate 34 by any suitable means, as by peening over the end, for instance.

The female receptacle 13 comprises an insulating body 37 having a central counterbore 38 in which is located a spring clip contact 39 provided with a screw 39' for connecting it to one of the leads 40 of the conduit 17. The central contact post 21 of the male plug 12 is provided with a ball head 41 connected to the body of the post 21 by a reduced neck 42 thereby enabling the female spring clip contact 39 to grip it firmly.

A second contact on the female receptacle comprises a ring plate 43 having a radius equal to the distance of the contact 29 from the central contact 21 of the male plug 12. The contact ring plate 43 is held in countersunk relation on the end of the receptacle 13 by a plurality of countersunk screws 44 and against the flanged end 45 of a finger 46 extending through the body 37 to another flanged end 47 having a screw 48 threaded therethrough for securing the other lead 49 of conduit 17 thereto.

In operation, the compression spring 24 is stronger than the spring clip contact 39, so that when the table leg 11 is properly placed over the receptacle 13 in the floor 14, the contact head 41 enters the spring clip contact 39 and is firmly held therein to make a good electrical contact therethrough. Meantime, the contact head 30 of the second contact post 29 is yieldably held against the contact ring plate 43 to complete the circuit, for so long as the head 41 is in the spring clip contact 39, the contact head 30 will press against some part of the circumference of the contact plate ring 43. Should it be necessary to move the table 10 to a location where no female receptacle 13 is available, the table may be placed anywhere without ruining the male receptacle permanently placed in its leg, for both contact posts therein will merely retract into the plug and the space therebehind, ready to be put into use at any time later that a female receptacle may be available.

Other modifications and changes in the proportions and arrangements of the parts may be made by those skilled in the art without departing from the nature and scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

A swivel electric attachment plug comprising a male plug portion and a female plug receptacle portion, the male plug portion having a central aperture therethrough, a contact post through said central aperture, a second contact post extending through a second aperture adjacent the side of the male plug, the female plug receptacle portion having a spring clip contact adapted to receive the male contact post therein, and a spring contact ring plate against which the second contact post of the male plug is adapted to bear, said second contact post having a contact head retractible to entirely enter within the body of the plug, and means yieldably urging said head out of the body, said central aperture in the male plug being counterbored, a collar on said central contact post and a spring in said central aperture resting against said collar to urge it into abutting relation with the shoulder of the counterbore and extend the contact post beyond the plug, said central contact being retractible against said spring to entirely enter within said plug.

JOHN A. SHERMAN.